United States Patent
Patwary et al.

(10) Patent No.: US 11,431,976 B2
(45) Date of Patent: Aug. 30, 2022

(54) SYSTEM AND METHOD FOR INSPECTION USING TENSOR DECOMPOSITION AND SINGULAR VALUE DECOMPOSITION

(71) Applicant: KLA Corporation, Milpitas, CA (US)

(72) Inventors: Nurmohammed Patwary, San Jose, CA (US); Richard Wallingford, San Jose, CA (US); James A. Smith, Los Altos, CA (US); Xiaochun Li, San Jose, CA (US); Vladimir Tumakov, Milpitas, CA (US); Bjorn Brauer, Beaverton, OR (US)

(73) Assignee: KLA Corporation, Milpitas, CA (US)

( * ) Notice: Subject to any disclaimer, the term of this patent is extended or adjusted under 35 U.S.C. 154(b) by 357 days.

(21) Appl. No.: 16/744,301

(22) Filed: Jan. 16, 2020

(65) Prior Publication Data
US 2020/0244963 A1 Jul. 30, 2020

Related U.S. Application Data

(60) Provisional application No. 62/797,581, filed on Jan. 28, 2019, provisional application No. 62/905,063, filed on Sep. 24, 2019.

(51) Int. Cl.
*G06K 9/00* (2022.01)
*H04N 19/126* (2014.01)
(Continued)

(52) U.S. Cl.
CPC ....... *H04N 19/126* (2014.11); *G01N 21/9501* (2013.01); *H04N 19/60* (2014.11)

(58) Field of Classification Search
CPC .. G06K 9/6407; G06K 9/6423; H04N 19/126; H04N 19/60; G01N 21/9501;
(Continued)

(56) References Cited

U.S. PATENT DOCUMENTS 7,295,695 B1    11/2007  Dayal
7,826,072 B1 *  11/2010  Wack ............... G01B 11/24
                                          700/121
(Continued)

FOREIGN PATENT DOCUMENTS

CN    107202806 A    9/2017
CN    107392107 A    11/2017
(Continued)

OTHER PUBLICATIONS

De Lathauwer, Lieven et al., "A Multilinear Singular Value Decomposition", SIAM J. Matrix Anal. Appl., vol. 21, No. 4, pp. 1253-1278 (2000).
(Continued)

*Primary Examiner* — Amir Alavi
(74) *Attorney, Agent, or Firm* — Suiter Swantz pc llo

(57) ABSTRACT

A sample characterization system is disclosed. In embodiments, the sample characterization system includes a controller communicatively coupled to an inspection sub-system, the controller including one or more processors configured to execute a set of program instructions stored in memory, the set of program instructions configured to cause the one or more processors to: acquire one or more target image frames of a sample; generate a target tensor with the one or more acquired target image frames; perform a first set of one or more decomposition processes on the target tensor to generate one or more reference tensors including one or more reference image frames; identify one or more differences between the one or more target image frames and the one or more reference image frames; and determine one or more characteristics of the sample based on the one or more identified differences.

29 Claims, 10 Drawing Sheets

(51) Int. Cl.
  *H04N 19/60* (2014.01)
  *G01N 21/95* (2006.01)
(58) Field of Classification Search
  CPC .............. G01N 21/88; G01N 21/95607; G06T 7/0004; G06T 7/001; G06T 2207/30148; G06T 2207/30164; G03F 1/84; G03F 1/144; G01B 11/24; G01B 11/024; B23Q 17/24
  See application file for complete search history.

(56) References Cited

U.S. PATENT DOCUMENTS

| | | | |
|---|---|---|---|
| 8,040,511 B1 * | 10/2011 | Krishnan | G01N 21/211 356/369 |
| 8,798,184 B2 | 8/2014 | Su et al. | |
| 8,887,105 B1 | 11/2014 | Bruguier et al. | |
| 9,551,567 B2 | 1/2017 | David et al. | |
| 10,353,191 B2 | 7/2019 | Anthony et al. | |
| 2004/0054528 A1 | 3/2004 | Hoya et al. | |
| 2006/0001673 A1 | 1/2006 | Brand | |
| 2010/0158345 A1 * | 6/2010 | Kitamura | G06T 7/13 382/145 |
| 2010/0215247 A1 * | 8/2010 | Kitamura | G06T 7/001 382/145 |
| 2014/0031969 A1 * | 1/2014 | Baseman | G05B 13/048 700/121 |
| 2015/0305657 A1 | 10/2015 | Lasenby et al. | |
| 2018/0276808 A1 | 9/2018 | Brauer et al. | |
| 2018/0342051 A1 * | 11/2018 | Sezginer | G06T 7/001 |
| 2019/0287015 A1 | 9/2019 | Plihal | |
| 2020/0125044 A1 * | 4/2020 | Ide | G06N 3/08 |
| 2020/0244963 A1 * | 7/2020 | Patwary | G06T 7/001 |
| 2020/0327654 A1 * | 10/2020 | Zhang | G06T 7/001 |
| 2021/0133989 A1 * | 5/2021 | Bhattacharyya | G06V 20/69 |
| 2021/0140899 A1 * | 5/2021 | Park | G01N 21/95607 |

FOREIGN PATENT DOCUMENTS

| | | |
|---|---|---|
| CN | 107704831 A | 2/2018 |
| CN | 109815849 A | 5/2019 |
| CN | 109858109 A | 6/2019 |
| CN | 110060219 A | 7/2019 |
| WO | 0150084 A1 | 7/2001 |
| WO | 2017116074 A1 | 7/2017 |

OTHER PUBLICATIONS

International Search Report and Written Opinion dated May 20, 2020 for PCT/US2020/014868.

Tulala, Peter et al., "Unsupervised Wafermap Patterns Clustering via Variational Autoencoders", 2018 International Joint Conference on Neural Networks (IJCNN), pp. 4081-4088.

Venkateswaran, T.D., "Direct Detection in Fabric Images Using Two Dimensional Discrete Wavelet Transformation Technique", International Journal of Computer Science & Communication Networks, vol. 4(1), Accessed Oct. 23, 2019, pp. 33-40.

Zhu, Yanling et al., "Denoising Ultrasonic Echo Signals with Generalized S Transform and Singular Value Decomposition", Traitement du Signal, vol. 36, No. 2, Apr. 2019, pp. 139-145.

* cited by examiner

SYSTEM AND METHOD FOR INSPECTION USING TENSOR DECOMPOSITION AND SINGULAR VALUE DECOMPOSITION

CROSS-REFERENCE TO RELATED APPLICATION

The present application claims the benefit under 35 U.S.C. § 119(e) of U.S. Provisional Application Ser. No. 62/797,581, filed Jan. 28, 2019, entitled DEFECT INSPECTION USING TENSOR DECOMPOSITIONS, naming Richard Wallingford as inventor, and U.S. Provisional Application Ser. No. 62/905,063, filed Sep. 24, 2019, entitled PATTERN NOISE REMOVAL USING SINGULAR VALUE DECOMPOSITION TO INCREASE SENSITIVITY OF BRIGHTFIELD WAFER INSPECTION TOOLS, naming Nurmohammed Patwary, James A. Smith, Xiaochun Li, Richard Wallingford, Vladimir Tumakov, and Bjorn Brauer as inventors, both of which are incorporated herein by reference in the entirety.

TECHNICAL FIELD

The present invention generally relates to semiconductor wafer fabrication and characterization and, more particularly, to a system and method for improved semiconductor inspection using tensor decompositions and singular value decomposition (SVD) processes.

BACKGROUND

Demand for electronic logic and memory devices with ever-smaller footprints and features present a wide range of manufacturing challenges beyond fabrication at a desired scale. In the context of semiconductor fabrication, accurately identifying the type and size of defects is an important step in improving throughput and yield. Some conventional inspection techniques identify defects on a region of a sample (e.g., on a die of the sample) by comparing images of the die with images of adjacent die of the sample ("die-to-die"). Similarly, other conventional inspection techniques may identify defects on a die of a sample by comparing images of the die against a robust estimation of a reference image constructed from multiple neighboring die ("die-to-median die" or "die to computed reference die").

Using these conventional inspection techniques, the comparison of the respective images is typically carried out by subtraction after suitable sub-pixel alignment of all die used for the computation is performed. The subtraction operation between the images is intended to remove most of the intrinsic pattern of the sample, leaving any defect signals and residual noise components. The defect may then be detected if the defect signal value exceeds that of the residual noise signal. However, these conventional inspection techniques may include additional noise from adjacent reference imagery, leading to decreased sensitivity. For example, die-to-die inspection techniques may include process variation errors and alignment errors between the target die and the reference die. The use of more robust reference imagery in die-to-median die inspection techniques and/or die-to-computed reference die inspection techniques may reduce these process variation and alignment errors, but not to a degree which is suitable for many inspection processes.

Therefore, it would be desirable to provide a system and method which cures one or more of the shortfalls of previous approaches identified above.

SUMMARY

A sample characterization system is disclosed. In embodiments, the sample characterization system includes a controller communicatively coupled to an inspection sub-system, the controller including one or more processors configured to execute a set of program instructions stored in memory, the set of program instructions configured to cause the one or more processors to: acquire one or more target image frames of a sample; generate a target tensor with the one or more acquired target image frames; perform a first set of one or more decomposition processes on the target tensor to generate one or more reference tensors including one or more reference image frames; identify one or more differences between the one or more target image frames and the one or more reference image frames; and determine one or more characteristics of the sample based on the one or more identified differences.

A method for characterizing a sample is disclosed. In embodiments, the method includes: acquiring one or more target image frames of a sample; generating a target tensor with the one or more acquired target image frames; performing a first set of one or more decomposition processes on the target tensor to generate one or more reference tensors including one or more reference image frames; identifying one or more differences between the one or more target image frames and the one or more reference image frames; and determining one or more characteristics of the sample based on the one or more identified differences.

A sample characterization system is disclosed. In embodiments, the sample characterization system includes a controller communicatively coupled to an inspection sub-system, the controller including one or more processors configured to execute a set of program instructions stored in memory, the set of program instructions configured to cause the one or more processors to: acquire one or more difference image frames of a sample, the one or more difference image frames based on one or more target image frames and one or more reference image frames; generate one or more stacked difference images with the one or more acquired difference image frames; perform a set of one or more singular value decomposition (SVD) processes on the one or more stacked difference images to form a set of one or more singular vectors; selectively modify at least one singular vector of the set of one or more singular vectors to generate a modified set of one or more singular vectors; generate a modified stacked difference image based on the modified set of one or more singular vectors; and determine one or more characteristics of the sample based on the modified stacked difference image.

A method for characterizing a sample is disclosed. In embodiments, the method includes: acquiring one or more difference image frames of a sample, the one or more difference image frames based on one or more target image frames and one or more reference image frames; generating one or more stacked difference images with the one or more acquired difference image frames; performing a set of one or more singular value decomposition (SVD) processes on the one or more stacked difference images to form a set of one or more singular vectors; selectively modifying at least one singular vector of the set of one or more singular vectors to generate a modified set of one or more singular vectors; generating a modified stacked difference image based on the modified set of one or more singular vectors; and determining one or more characteristics of the sample based on the modified stacked difference image.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the disclosure may be better understood by those skilled in the art by reference to the accompanying figures in which.

DETAILED DESCRIPTION OF THE INVENTION

Figure 1:
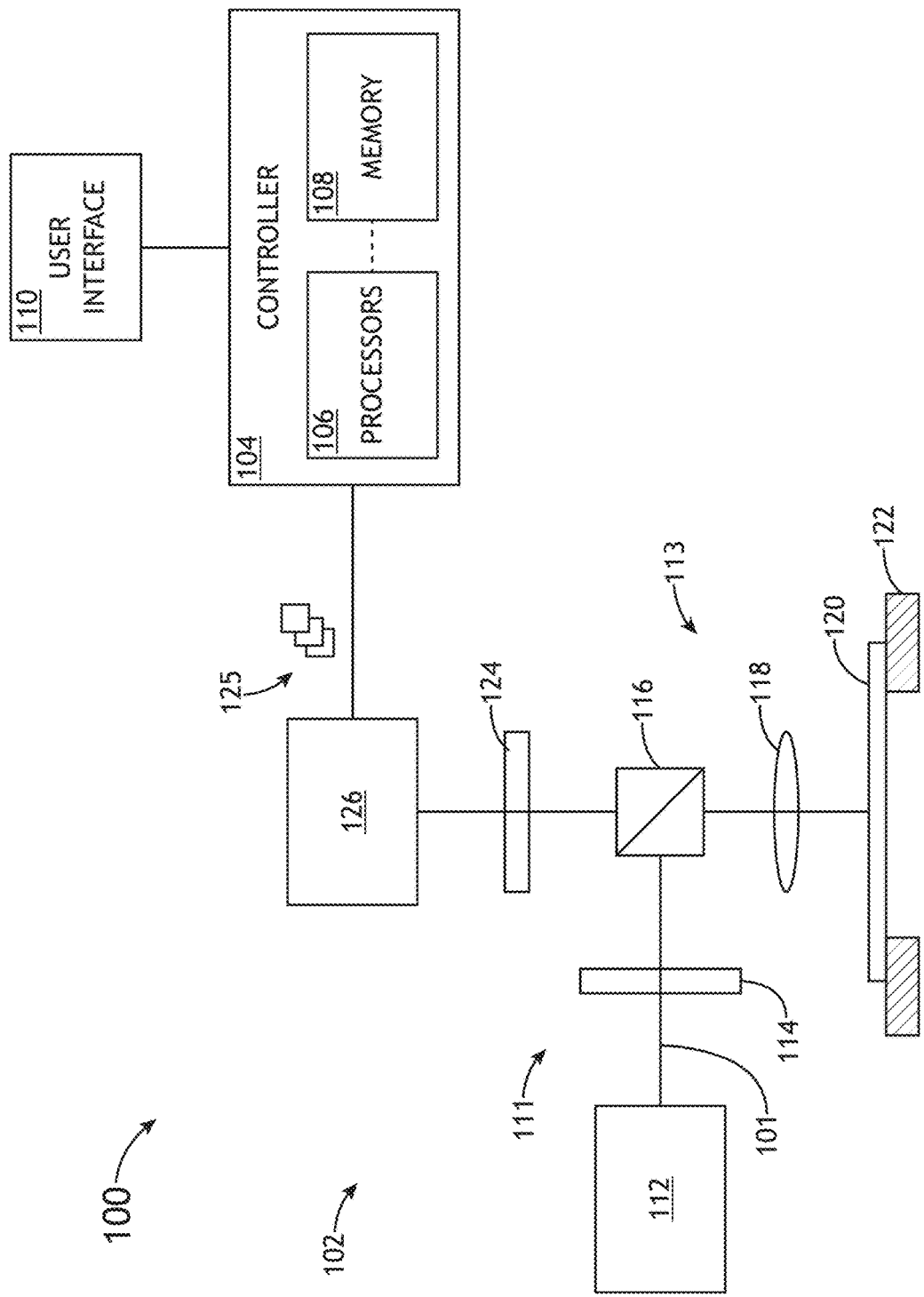
FIG. 1 illustrates a characterization system for performing inspection, in accordance with one or more embodiments of the present disclosure.

Reference will now be made in detail to the subject matter disclosed, which is illustrated in the accompanying drawings.

Referring generally to FIGS. 1-10, a system and method for inspection of semiconductor devices utilizing tensor decomposition and singular value decomposition (SVD) processes are described, in accordance with one or more embodiments of the present disclosure.

Some conventional inspection techniques identify defects on a region of a sample (e.g., on a die of the sample) by comparing images of the die with images of adjacent die of the sample ("die-to-die"). Similarly, other conventional inspection techniques may identify defects on a die of a sample by comparing images of the die against a robust estimation of a reference image constructed from multiple neighboring die ("die-to-median die" or "die to computed reference die"). For example, conventional inspection techniques may compare target images (e.g., images of die under inspection) to reference images of adjacent die to form difference images. The difference images may then be used to identify defects of the sample within the target die. Reference images may be formed using a number of techniques, including left and right adjacent die to the target with double detection (MDAT1), median of adjacent reference die (MDAT2 or PVS), computed reference die (e.g., optimal linear combination of die along a die row), and the like.

Using these conventional inspection techniques, the comparison of the respective images is typically carried out by subtraction after suitable sub-pixel alignment of all die used for the computation is performed. The subtraction operation between the images is intended to remove most of the intrinsic pattern of the sample, leaving any defect signals and residual noise components. The defect may then be detected if the defect signal value exceeds that of the residual noise signal. However, these conventional inspection techniques may include additional noise from adjacent reference imagery, leading to decreased sensitivity. For example, die-to-die inspection techniques may include process variation errors and alignment errors between the target die and the reference die. The use of more robust reference imagery in die-to-median die inspection techniques and/or die-to-computed reference die inspection techniques may reduce these process variation and alignment errors, but not to a degree which is suitable for many inspection processes.

Accordingly, embodiments of the present disclosure are directed to a system and method which cure one or more shortfalls of the previous approaches identified above. Embodiments of the present disclosure are directed to a system and method for detecting defects on semiconductor wafers (e.g., samples) which offer improved sensitivity over conventional inspection techniques. In particular, embodiments of the present disclosure are directed to a system and method for generating a new type of reference image for inspection comparison operations which may lower residual noise, and thereby enhance defect detection sensitivity. Some embodiments of the present disclosure are detected to a system and method for inspection of semiconductor devices utilizing tensor decomposition and singular value decomposition (SVD) processes.

FIG. 1 illustrates a characterization system 100 for performing inspection, in accordance with one or more embodiments of the present disclosure. In particular, FIG. 1 illustrates a system 100 for comparing target image frames 125 and reference image frames 135 using decomposition process in order to identify defects on a sample 120.

In embodiments, the system 100 may include an inspection sub-system 102. The inspection sub-system 102 may include any optical-based inspection/characterization system or tool known in the art including, but not limited to, an image-based metrology tool, a review tool, and the like. For example, the inspection sub-system 102 may include an optical dark-field inspection tool and/or an optical bright-field inspection tool. The inspection sub-system 102 may include, but is not limited to, an illumination source 112, an illumination arm 111, a collection arm 113, and a detector assembly 126.

In one embodiment, inspection sub-system 102 is configured to inspect and/or measure the sample 120 disposed on the stage assembly 122. Illumination source 112 may include any illumination source known in the art for generating illumination 101 including, but not limited to, a broadband radiation source (e.g., Xenon lamp, a laser-sustained plasma (LSP) illumination source), a narrowband illumination source (e.g., laser illumination source), and the like. The illumination source 112 may be configured to generate DUV, UV, VUV, and/or EUV illumination. For instance, the EUV illumination source may include a discharge produced plasma (DPP) illumination source or a laser produced plasma (LPP) illumination source configured to generate illumination in the EUV range. By way of another example, the illumination source 112 may be configured to generate X-ray radiation. In another embodiment, the illumination source 112 may be operably coupled to a set of positioners configured to actuate the illumination source 112 in one or more directions. For example, a controller 104 may direct the set of positioners to translate the illumination source 112 in one or more of an X-direction, a Y-direction, and/or a Z-direction to correct beam misalignment produced by any of the components of the system 100.

In another embodiment, inspection sub-system 102 may include an illumination arm 111 configured to direct illumination 101 to the sample 120. It is noted that illumination source 112 of inspection sub-system 102 may be configured in any orientation known in the art including, but not limited to, a dark-field orientation, a light-field orientation, and the like. For example, the one or more optical elements 114, 124 may be selectively adjusted in order to configure the inspection sub-system 102 in a dark-field orientation, a bright-field orientation, and the like.

Sample 120 may include any sample known in the art including, but not limited to, a wafer (e.g., semiconductor wafer), a reticle, a photomask, and the like. As used through the present disclosure, the term "wafer" refers to a substrate formed of a semiconductor and/or a non-semiconductor material. For instance, in the case of a semiconductor material, the wafer may be formed from, but is not limited to, monocrystalline silicon, gallium arsenide, and/or indium phosphide. In another embodiment, the sample 120 includes a photomask/reticle. As such, the terms "wafer," "sample," and "substrate" may be used interchangeably in the present disclosure. Therefore, the above description should not be interpreted as a limitation on the scope of the present disclosure but merely an illustration.

In one embodiment, sample 120 is disposed on a stage assembly 122 to facilitate movement of sample 120. In another embodiment, the stage assembly 122 is an actuatable stage. For example, the stage assembly 122 may include, but is not limited to, one or more translational stages suitable for selectively translating the sample 120 along one or more linear directions (e.g., x-direction, y-direction and/or z-direction). By way of another example, the stage assembly 122 may include, but is not limited to, one or more rotational stages suitable for selectively rotating the sample 120 along a rotational direction. By way of another example, the stage assembly 122 may include, but is not limited to, a rotational stage and a translational stage suitable for selectively translating the sample 120 along a linear direction and/or rotating the sample 120 along a rotational direction. It is noted herein that the system 100 may operate in any scanning mode known in the art.

The illumination arm 111 may include any number and type of optical components known in the art. In one embodiment, the illumination arm 111 includes one or more optical elements 114, a beam splitter 116, and an objective lens 118. In this regard, illumination arm 111 may be configured to focus illumination 101 from the illumination source 112 onto the surface of the sample 120. The one or more optical elements 114 may include any optical elements known in the art including, but not limited to, one or more mirrors, one or more lenses, one or more polarizers, one or more beam splitters, wave plates, and the like.

In another embodiment, optical inspection sub-system 102 includes a collection arm 113 configured to collect illumination reflected or scattered from sample 120. In another embodiment, collection arm 113 may direct and/or focus the reflected and scattered light to one or more sensors of a detector assembly 126 via one or more optical elements 124. The one or more optical elements 124 may include any optical elements known in the art including, but not limited to, one or more mirrors, one or more lenses, one or more polarizers, one or more beam splitters, wave plates, and the like. It is noted that detector assembly 126 may include any sensor and detector assembly known in the art for detecting illumination reflected or scattered from the sample 120.

In another embodiment, the detector assembly 126 of the optical inspection sub-system 102 is configured to collect metrology data of the sample 120 based on illumination reflected or scattered from the sample 120. The detector assembly 126 may include any detector assembly known in the art including, but not limited to, photo-multiplier tubes (PMTs), charge coupled devices (CCDs), time-delay integration (TDI) cameras, or the like. In another embodiment, the detector assembly 126 is configured to transmit collected/acquired images/image frames (e.g., target image frames 125) and/or metrology data to the controller 104.

In embodiments, the controller 104 may be communicatively coupled to the various components of the inspection sub-system 102. For example, the controller 104 may be operably coupled to the illumination source 112, the stage assembly 122, and/or the detector assembly 126. The controller 104 of system 100 may include one or more processors 106 and memory 108. The memory 108 may include program instructions configured to cause the one or more processors 106 to carry out various steps of the present disclosure. In one embodiment, the program instructions are configured to cause the one or more processors 106 to adjust one or more characteristics of the optical inspection sub-system 102 in order to perform one or more measurements of the sample 120.

In one embodiment, the one or more processors 106 may include any one or more processing elements known in the art. In this sense, the one or more processors 106 may include any microprocessor-type device configured to execute software algorithms and/or instructions. In one embodiment, the one or more processors 106 may consist of a desktop computer, mainframe computer system, workstation, image computer, parallel processor, or other computer system (e.g., networked computer) configured to execute a program configured to operate the system 100, as described throughout the present disclosure. It should be recognized that the steps described throughout the present disclosure may be carried out by a single computer system or, alternatively, multiple computer systems. Furthermore, it should be recognized that the steps described throughout the present disclosure may be carried out on any one or more of the one or more processors 106. In general, the term "processor" may be broadly defined to encompass any device having one or more processing elements, which execute program instructions from memory 108. Moreover, different subsystems of the system 100 (e.g., illumination source 112, detector assembly 126, controller 104, user interface 110, and the like) may include processor or logic elements suitable for carrying out at least a portion of the steps described throughout the present disclosure. Therefore, the above description should not be interpreted as a limitation on the present disclosure but merely an illustration.

The memory 108 may include any storage medium known in the art suitable for storing program instructions executable by the associated one or more processors 106 and the data received from the inspection sub-system 102. For example, the memory 108 may include a non-transitory memory medium. For instance, the memory 108 may include, but is not limited to, a read-only memory (ROM), a random-access memory (RAM), a magnetic or optical memory device (e.g., disk), a magnetic tape, a solid-state drive and the like. It is further noted that memory 108 may be housed in a common controller housing with the one or more processors 106. In an alternative embodiment, the memory 108 may be located remotely with respect to the physical location of the processors 106, controller 104, and the like. In another embodiment, the memory 108 maintains program instructions for causing the one or more processors 106 to carry out the various steps described through the present disclosure.

In one embodiment, a user interface 110 is communicatively coupled to the controller 104. In one embodiment, the user interface 110 may include, but is not limited to, one or more desktops, tablets, smartphones, smart watches, or the like. In another embodiment, the user interface 110 includes a display used to display data of the system 100 to a user. The display of the user interface 110 may include any display known in the art. For example, the display may include, but is not limited to, a liquid crystal display (LCD), an organic light-emitting diode (OLED) based display, or a CRT display. Those skilled in the art should recognize that any display device capable of integration with a user interface 110 is suitable for implementation in the present disclosure. In another embodiment, a user may input selections and/or instructions responsive to data displayed to the user via a user input device of the user interface 110.

As noted previously, the controller 104 of system 100 may include one or more processors 106 configured to execute a set of program instructions stored in memory 108, the set of program instructions configured to cause the one or more processors 106 to carry out various steps/functions of the present disclosure. In one embodiment, the program instructions are configured to cause the one or more processors 106 to adjust one or more characteristics of the inspection sub-system 102 in order to perform one or more measurements of the sample 120. By way of another example, the set of program instructions may be configured to cause the one or more processors 106 of the controller 104 to: acquire one or more target image frames of a sample; generate a target tensor with the one or more acquired target image frames; perform a first set of one or more decomposition processes on the target tensor to form a core tensor; generate one or more reference tensors including one or more reference image frames based on the core tensor; identify one or more differences between the one or more target image frames and the one or more reference image frames; and determine one or more characteristics of the sample based on the one or more identified differences.

Figure 2:
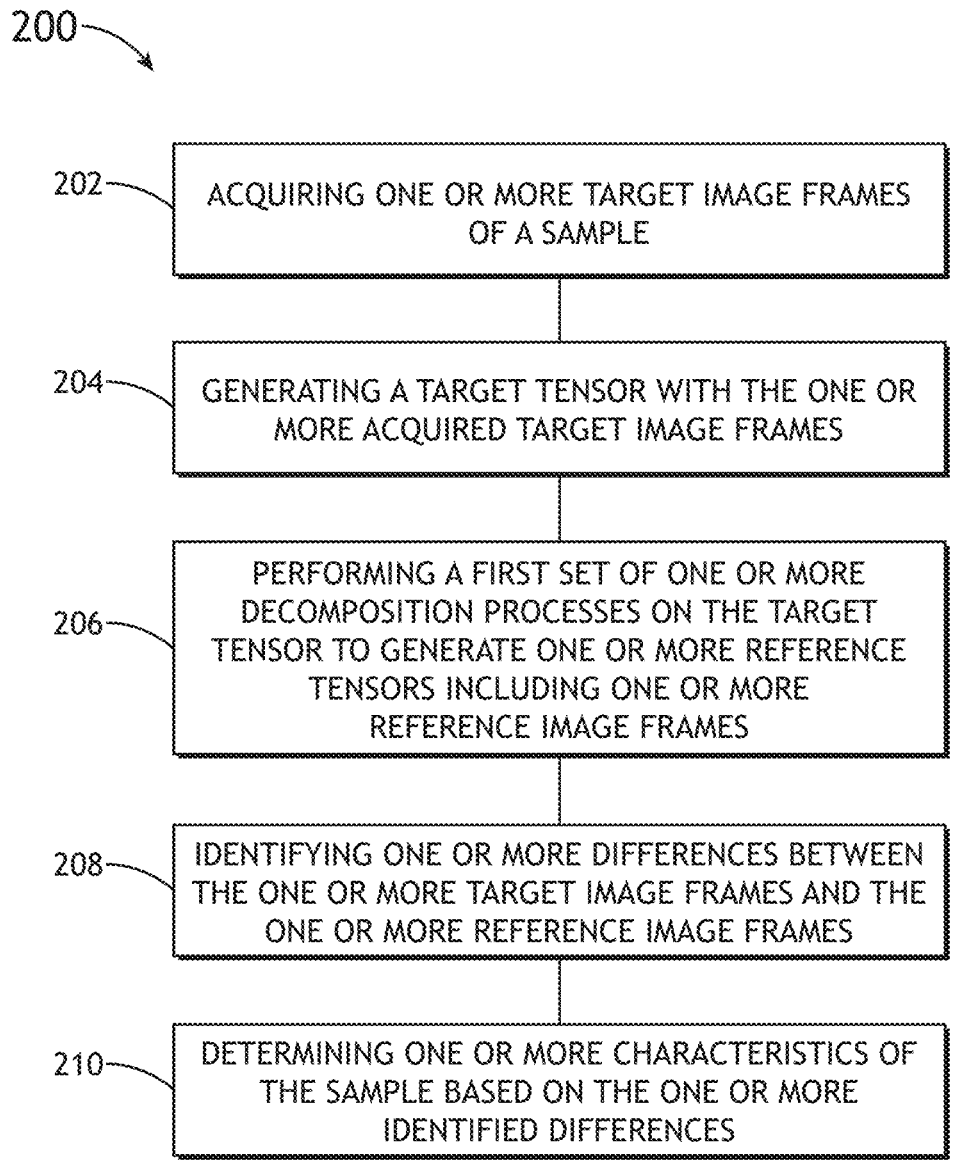
FIG. 2 illustrates a flowchart of a method for performing inspection using tensor decomposition processes, in accordance with one or more embodiments of the present disclosure.

The various steps/functions carried out by the controller 104 may be further shown and understood with reference to FIG. 2.

FIG. 2 illustrates a flowchart of a method 200 for performing inspection using tensor decomposition processes, in accordance with one or more embodiments of the present disclosure. It is noted herein that the steps of method 200 may be implemented all or in part by system 100. It is further recognized, however, that the method 200 is not limited to the system 100 in that additional or alternative system-level embodiments may carry out all or part of the steps of method 200.

Figure 3:
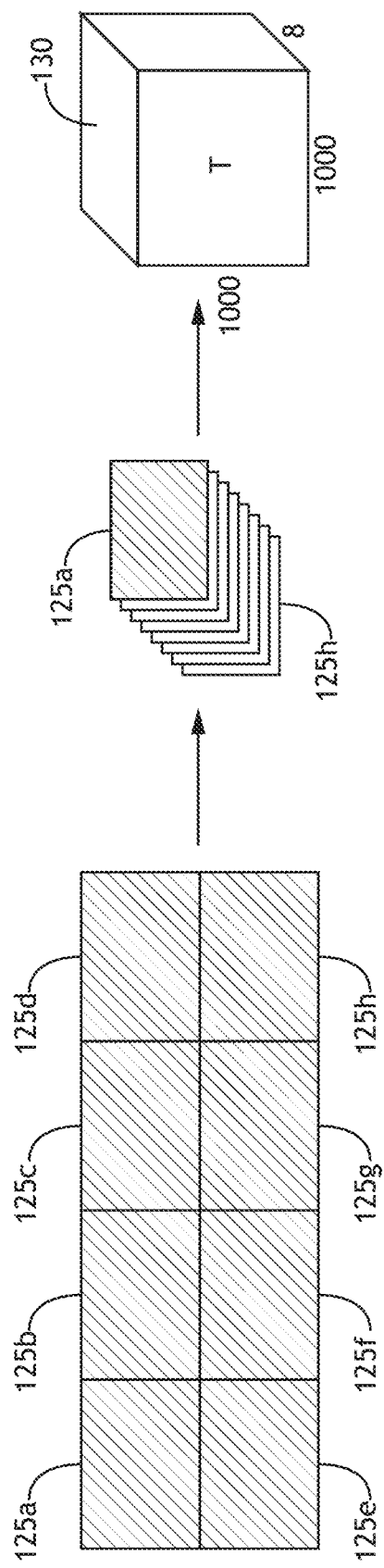
FIG. 3 illustrates a flowchart for generating a target tensor from target image frames of a sample, in accordance with one or more embodiments of the present disclosure.

In a step 202, one or more target image frames 125 of a sample 120 are acquired. For example, FIG. 3 illustrates a flowchart for generating a target tensor 130 from target image frames 125 of a sample 120, in accordance with one or more embodiments of the present disclosure. As shown in FIG. 3, the controller 104 may be configured to acquire a plurality of target image frames 125a-125h of a sample 120. The target image frames 125a-125h may be received from any source known in the art including, but not limited to, the inspection sub-system 102, memory 108, a network, and the like. For example, the controller 104 may be configured to cause the inspection sub-system 102 to acquire one or more target image frames 125a-125h, and may then receive the one or more acquired target image frames 125a-125h from the inspection sub-system 102. In embodiments, the controller 104 may store the acquired target image frames 125a-125h in memory 108.

In embodiments, the target image frames 125 may be acquired across a plurality of regions across the sample 120. For example, as shown in FIG. 3, the target image frames 125 may be acquired across two die rows across the sample 120. In this example, one or more target image frames 125 may be acquired of adjacent regions/portions of the sample 120. The target image frames 125 may be acquired such that they each include die of the sample 120 which are fabricated according to identical and/or similar design data. In this regard, as shown in FIG. 3, the plurality of target image frames 125 may include similar and/or identical patterned features/structures formed on the sample 120.

In a step 204, a target tensor 130 (T) is generated with the one or more acquired target image frames 125. For example, the controller 104 may be configured to generate a target tensor 130 utilizing the acquired target image frames 125a-125h. For instance, as shown in FIG. 3, the controller 104 may be configured to form the target tensor 130 by stacking the one or more target image frames 125a-125h. While FIG. 3 illustrates forming the target tensor 130 using eight target image frames 125a-125h, this is not to be regarded as a limitation of the present disclosure, unless noted otherwise herein. In this regard, the controller 104 may be configured to form the target tensor 130 using any number of target image frames 125a-125n.

In a step 206, a first set of one or more decomposition processes are performed on the target tensor 130 (T) to form one or more reference tensors 136 ($T_B$) including one or more reference image frames. This may be further understood with reference to FIGS. 4 and 5.

Figure 4:
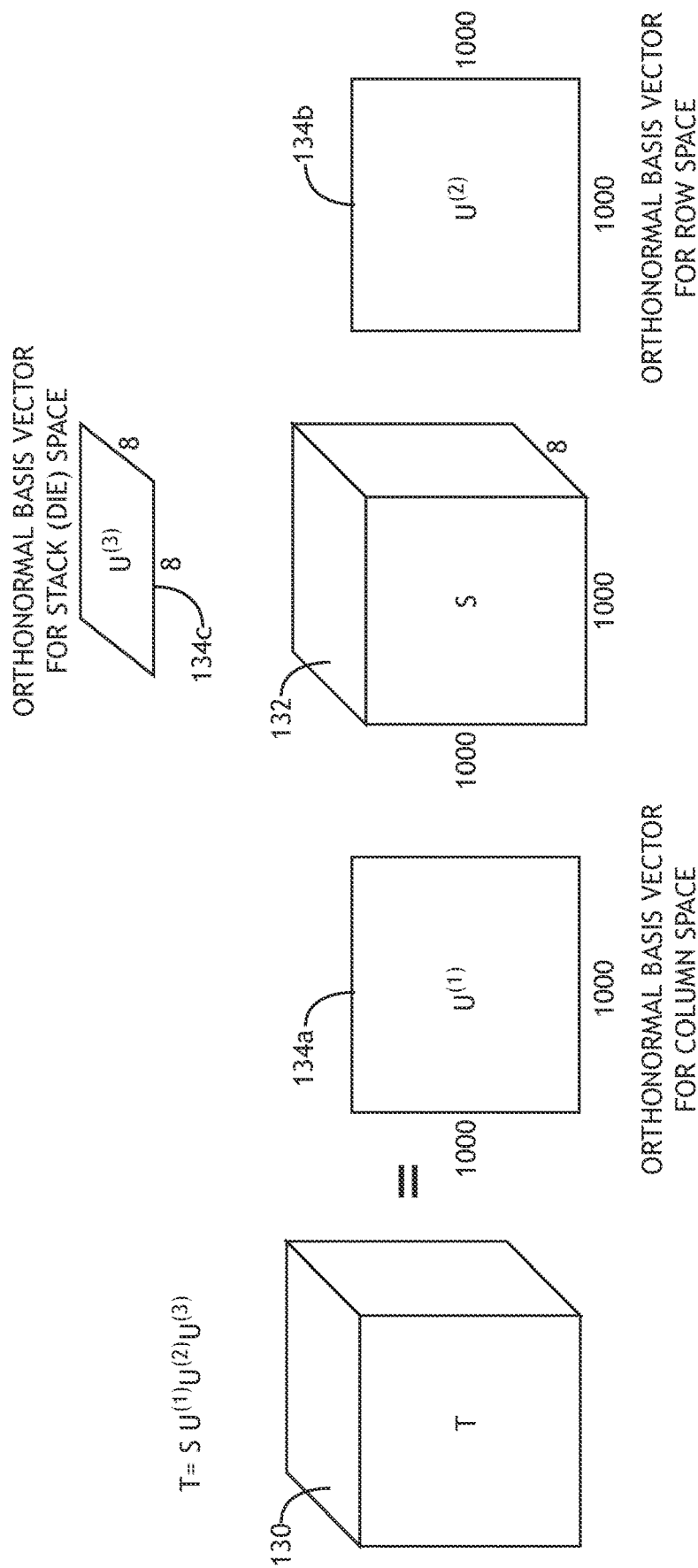
FIG. 4 illustrates a simplified block diagram of a decomposition process performed on a target tensor, in accordance with one or more embodiments of the present disclosure.

FIG. 4 illustrates a simplified block diagram of a decomposition process performed on a target tensor 130, in accordance with one or more embodiments of the present disclosure.

In some embodiments, as shown in FIG. 4, decomposition of the target tensor 130 (T) may be described according to Equation 1:

$$T = SU^{(1)}U^{(2)}U^{(3)} \quad (1)$$

wherein T defines the target tensor 130 made up of target image frames 125a-125n, S defines a core tensor 132, $U^{(1)}$ defines an orthonormal basis vector 134a for a column space of the target tensor 130, $U^{(2)}$ defines an orthonormal basis vector 134b for a row space of the target tensor 130, and $U^{(3)}$ defines an orthonormal basis vector 134c for a die space (stack space) of the target tensor 130.

The set of one or more decomposition processes used to determine the core tensor 132 (S) from the target tensor 130 (T) may include any decomposition processes known in the art including, but not limited to, multi-linear decomposition processes. For example, in some embodiments, the set of decomposition processes performed in step 206 may include a Tucker decomposition process. For instance, the set of decomposition processes performed in step 206 may include a multilinear singular value decomposition (SVD) process, as shown in FIG. 4. In some embodiments, the controller 104 is configured to perform the first set of one or more decomposition processes on the target tensor 130 using the first orthonormal basis vector 134a ($U^{(1)}$) for a column space of the target tensor 130, a second orthonormal basis vector 134b ($U^{(2)}$) for a row space of the target tensor 130, and a third orthonormal basis vector 134c ($U^{(3)}$) for a stack space of the target tensor 130.

Tucker decomposition processes are described in greater detail by L. R. Tucker in *The Extension of Factor Analysis to Three-Dimensional Matrices*, Contributions to Mathematical Psychology, Hold, Rinehart and Winston, New York, 1964, which is incorporated herein by reference in the entirety. Similarly, singular value decomposition (SVD) processes are described in greater detail by Lieven De Lathauwer, et al., in *A Multilinear Singular Value Decomposition*, SIAM J. Matrix Anal. Appl., Vol. 21, No. 4, pp. 1253-1278 (2000), which is incorporated herein by reference in the entirety.

In embodiments, the controller 104 may be configured to generate a reference tensor 136 ($T_B$) which includes one or more reference image frames based on the core tensor 132 (S). In this regard, the controller 104 may be configured to generate one or more reference image frames based on the core tensor 132 (S). In some embodiments, the controller 104 is configured to generate the one or more reference tensors 136 ($T_B$) by performing one or more low-rank approximations of the core tensor 132 (S) generated via the multilinear decompositions. The controller 104 may be configured to store generated reference tensors 136 ($T_B$) and/or reference image frames 155 in memory 108.

For example, the controller 104 may generate the reference tensor 136 ($T_B$) (and reference image frames) via a low-rank approximation by truncating at least a portion of the core tensor 132 (S) and/or by truncating at least a portion of at least one of the orthonormal basis vectors 134a, 134b, 134c ($U^{(1)}$, $U^{(2)}$, $U^{(3)}$). As opposed to a full-rank decomposition, which would result in a reference tensor 136 ($T_B$) which exactly represents the target tensor 130 (T) (within numerical precision), a low-rank approximation may be performed in order to estimate the background pattern of the sample 120 using only lower-rank terms. This may be further understood with reference to FIG. 5.

Figure 5:
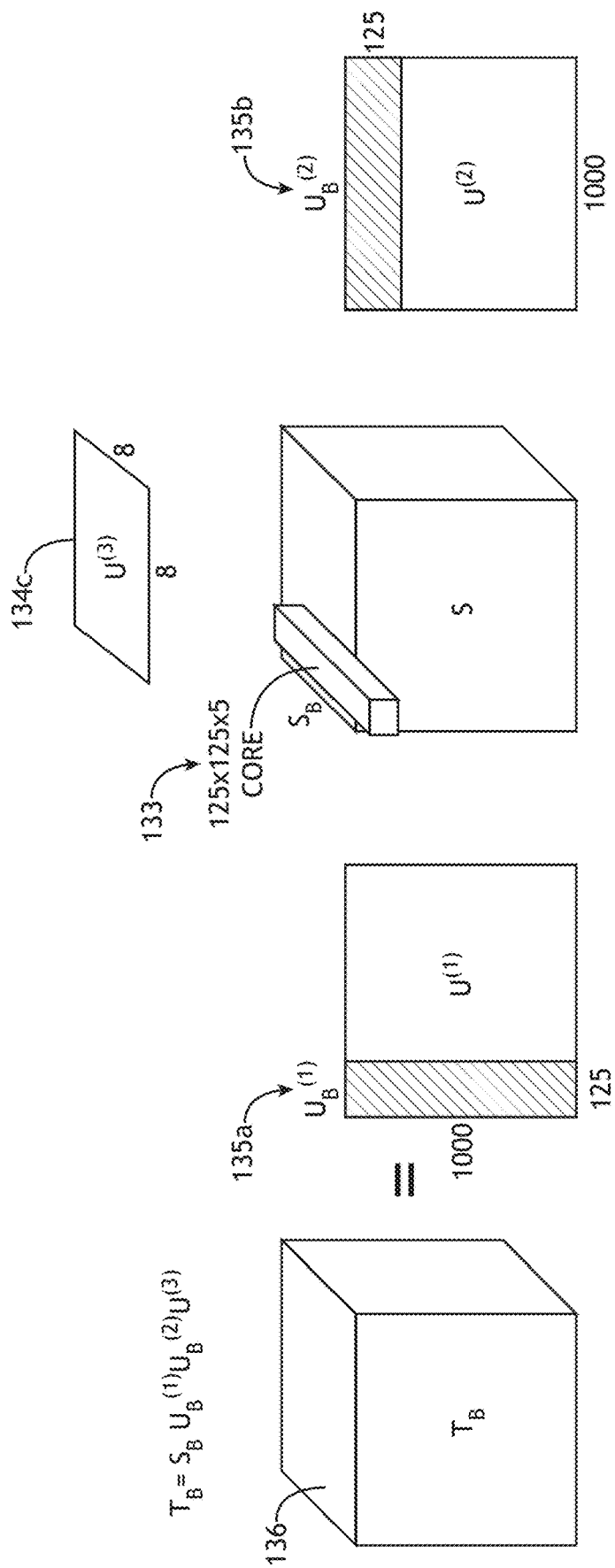
FIG. 5 illustrates a simplified block diagram of a decomposition process performed on a target tensor, in accordance with one or more embodiments of the present disclosure.
Figure 6:
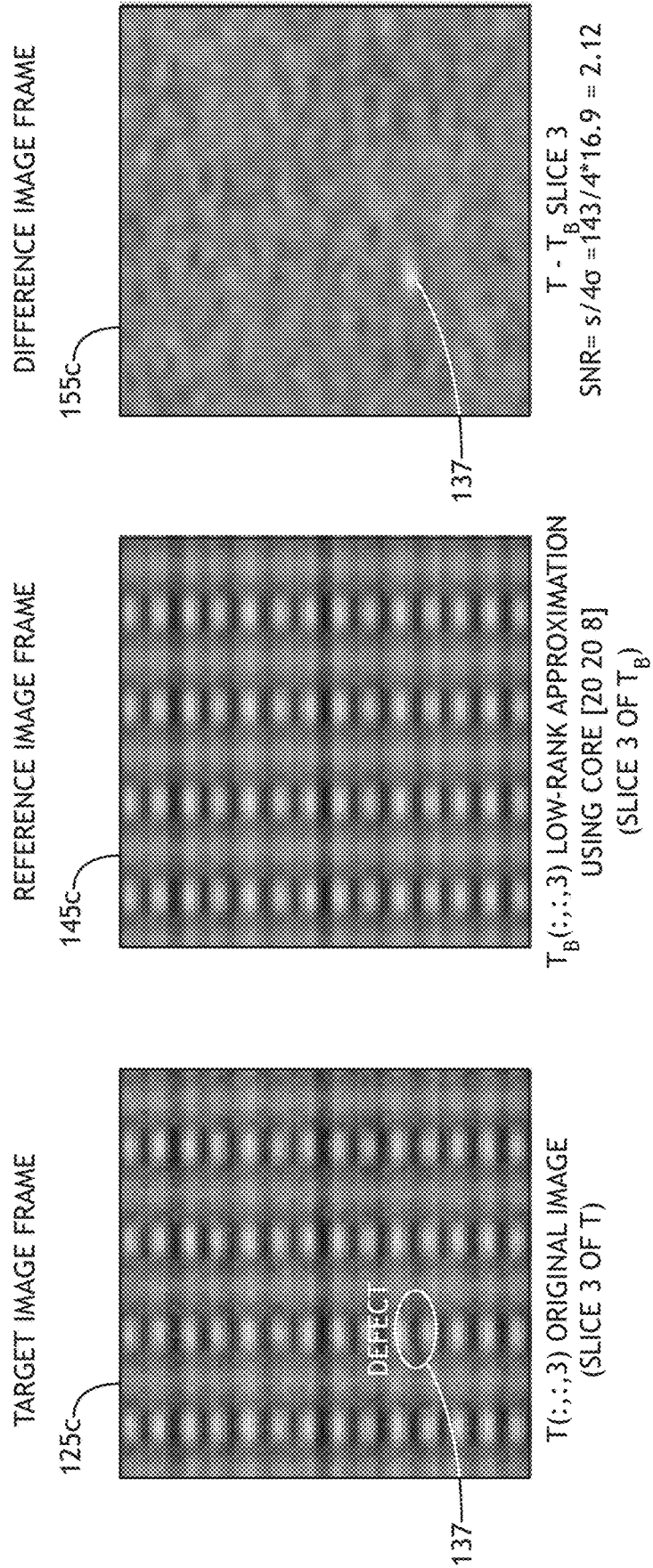
FIG. 6A illustrates a target image frame of a target tensor, in accordance with one or more embodiments of the present disclosure.
FIG. 6B illustrates a reference image frame of a reference tensor, in accordance with one or more embodiments of the present disclosure.
FIG. 6C illustrates a difference image frame, in accordance with one or more embodiments of the present disclosure.
Figure 7:
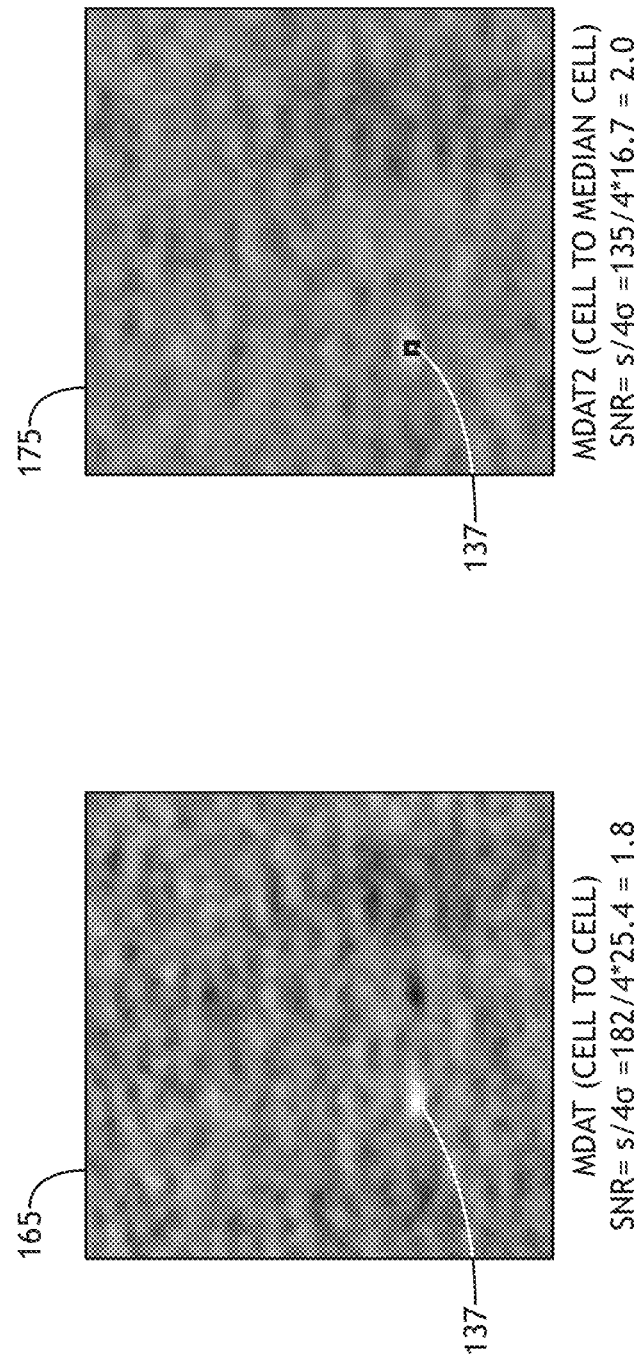
FIG. 7A illustrates a difference image frame generated by a conventional "die-to-die" or "cell-to-cell" inspection technique.
FIG. 7B illustrates a difference image frame generated by a conventional "die-to-median die" or "cell-to-median cell" inspection technique.

FIG. 5 illustrates a simplified block diagram of a decomposition process performed on a target tensor 130 (T), in accordance with one or more embodiments of the present disclosure.

By way of example, the controller 104 may be configured to generate a reference tensor 136 ($T_B$) (and reference image frames) via a low-rank approximation by truncating a portion of the core tensor 132 (S) to generate a truncated core tensor 133 ($S_B$). Similarly, the controller 104 may be configured to truncate a portion of orthonormal basis vector 134a ($U^{(1)}$) and orthonormal basis vector 134b ($U^{(2)}$) to generate truncated orthonormal basis vector 135a ($U_B^{(1)}$) and truncated orthonormal basis vector 135b ($U_B^{(2)}$). For instance, the controller 104 may truncate the orthonormal basis vectors 134a, 134b ($U^{(1)}$, $U^{(2)}$) to achieve a truncation value in X and Y of 125. It is noted herein that the controller 104 may be configured to perform the low-rank approximations without truncating the orthonormal basis vector 134c ($U^{(3)}$) for the die space/stack space in order to track as much die-to-die variation as possible. Accordingly, as shown in FIG. 5, the controller 104 may abstain from truncating the orthonormal basis vector 134c ($U^{(3)}$) for the die space/stack space when generating the reference tensor 136 ($T_B$) (and reference image frames) via low-rank approximations. Subsequently, the controller 104 may be configured to generate the reference tensor 136 ($T_B$) according to Equation 2:

$$T_B = S_B U_B^{(1)} U_B^{(2)} U^{(3)} \quad (2)$$

It is contemplated herein that the low-rank approximation, represented as reference tensor 136 ($T_B$), may correspond to the target tensor 130 and may include a stack of reference image frames corresponding to the target image frames 125. These reference tensors 136 ($T_B$) and reference image frames may exhibit the overall essence of the pattern imagery on the sample 120 within each reference image frame, and may not capture (e.g., omit) random effects such as shot noise and defect signals. In this regard, the reference target images of the reference tensor 136 ($T_B$) may capture the essence of the background pattern of the sample 120, and may be formed based only on the original target image frames 125.

In particular, by performing a low-rank approximation (instead of a full-rank decomposition), embodiments of the present disclosure have been found to accurately estimate background patterns of the sample 120 while avoiding die-to-die alignment errors and process variation errors associated with conventional inspection techniques. Furthermore, because the reference image frames may be generated directly from acquired target image frames 125a-125n, embodiments of the present disclosure may enable faster inspection and improve throughput.

It is noted herein that a single target image frame 125 could be used throughout method 200 to generate a reference tensor 136 ($T_B$) including a single reference image frame. However, it is further noted herein that the use of multiple target image frames 125 to construct the target tensor 130 (across either multiple die or multiple cells) may reinforce the background pattern representation of the sample 120 at issue, and may thereby improve the estimation of the true pattern within the generated reference image frames.

It is further noted herein that the granularity of background estimation (e.g., coarse estimations vs. fine estimations) may generate a trade-off between background suppression and defect signal suppression. Accordingly, proper selection of the truncation rank used for the low-rank approximations is a crucial step to obtaining accurate, high-quality reference tensors 136 ($T_B$) and reference image frames. Accordingly, in some embodiments, the controller 104 may be configured to determine the truncation rank used for the low-rank approximations by optimizing a signal-to-noise ratio (SNR) of $T-T_B$. In embodiments, the controller 104 may optimize the SNR of $T-T_B$ by using known defects as part of a recipe setup, or by using synthesized defects.

In a step 208, one or more differences are identified between the one or more target image frames 125 and the one or more reference image frames. This may be further understood with reference to FIGS. 6A-6C.

FIG. 6A illustrates a target image frame 125c of a target tensor 130 (T), in accordance with one or more embodiments of the present disclosure. FIG. 6B illustrates a reference image frame 145c of a reference tensor 136 ($T_B$), in accordance with one or more embodiments of the present disclosure. FIG. 6C illustrates a difference image frame 155c, in accordance with one or more embodiments of the present disclosure.

In some embodiments, the controller 104 may be configured to identify one or more differences by subtracting the reference image frames 145 from the target image frames 125. In this regard, the controller 104 may be configured to generate a difference tensor including one or more difference image frames 155 by subtracting the reference image frames 145 of the reference tensor 136 ($T_B$) from the target image frames 125 of the target tensor 130 (T) (e.g., $T-T_B$). For example, FIG. 6A illustrates a third target image frame 125c of a target tensor 130, and FIG. 6B illustrates a third reference image frame 145c of a reference tensor 136 ($T_B$) corresponding to the third target image frame 125c. In this example, the controller 104 may be configured to generate a third difference image frame 155c by subtracting the third reference image frame 145c from the third target image frame 125c. The controller 104 may be configured to store generated difference tensors and/or difference image frames 155 in memory 108. Subsequently, the controller 104 may be configured to identify one or more differences between the target image frames 125 and the reference image frames 145.

As shown in FIGS. 6A-6C, subtraction of reference image frames 145 from target image frames 125 should reveal any random components within the images, including any defects. For instance, by subtracting the estimated background structure of the reference image frame 145c from the target image frame 125c, a defect 137 within the target image frame 125c may be clearly shown in the generated difference image frame 155c. By removing the background structure (e.g., subtracting reference image frames 145), defects 137 within the target image frames 125 may be clearly revealed.

FIG. 7A illustrates a difference image frame 165 generated by a conventional "die-to-die" or "cell-to-cell" inspection technique, and FIG. 7B illustrates a difference image frame 175 generated by a conventional "die-to-median die" or "cell-to-median cell" inspection technique.

By comparing the difference image frames 165, 175 of FIGS. 7A and 7B to the difference image frame 155c in FIG. 6C, it may be appreciated that embodiments of the present disclosure may enable the production of higher quality difference images. In particular, for this example, it was found that embodiments of the present disclosure were able to achieve higher SNR values within the generated difference images as compared to conventional inspection techniques which utilize the same difference filter (diff filter).

In a step 210, one or more characteristics of the sample 120 are determined based on the one or more identified differences. For example, the controller 104 may be configured to determine one or more characteristics of the sample 120 based on one or more characteristics of the one or more generated difference image frames 155. The controller 104 may be configured to determine any characteristics of the sample 120 known in the art including, but not limited to, defects (e.g., defect location, defect type), measurements (e.g., critical dimensions), and the like.

In embodiments, the controller 104 may be configured to selectively adjust one or more process tools based on the determined characteristics of the sample 120. For example, in some embodiments, the system 100 may further include one or more process tools. The process tools may include any process tools known in the art including, but not limited to, a lithography tool, an etching tool, a deposition tool, and the like. In this example, the controller 104 may be configured to generate one or more control signals configured to selectively adjust one or more characteristics of one or more process tools based on the one or more determined characteristics of the sample 120. In this regard, the controller 104 may be configured to initiate feedforward and/or feedback control loops in order to selectively adjust various steps of a semiconductor device fabrication process.

In some embodiments, the controller 104 may be further configured to de-noise the target tensor 130/target image frames 125 prior to comparison with the reference tensor 136 ($T_B$)/reference image frames 145. This may be further understood with reference to FIG. 8.

Figure 8:
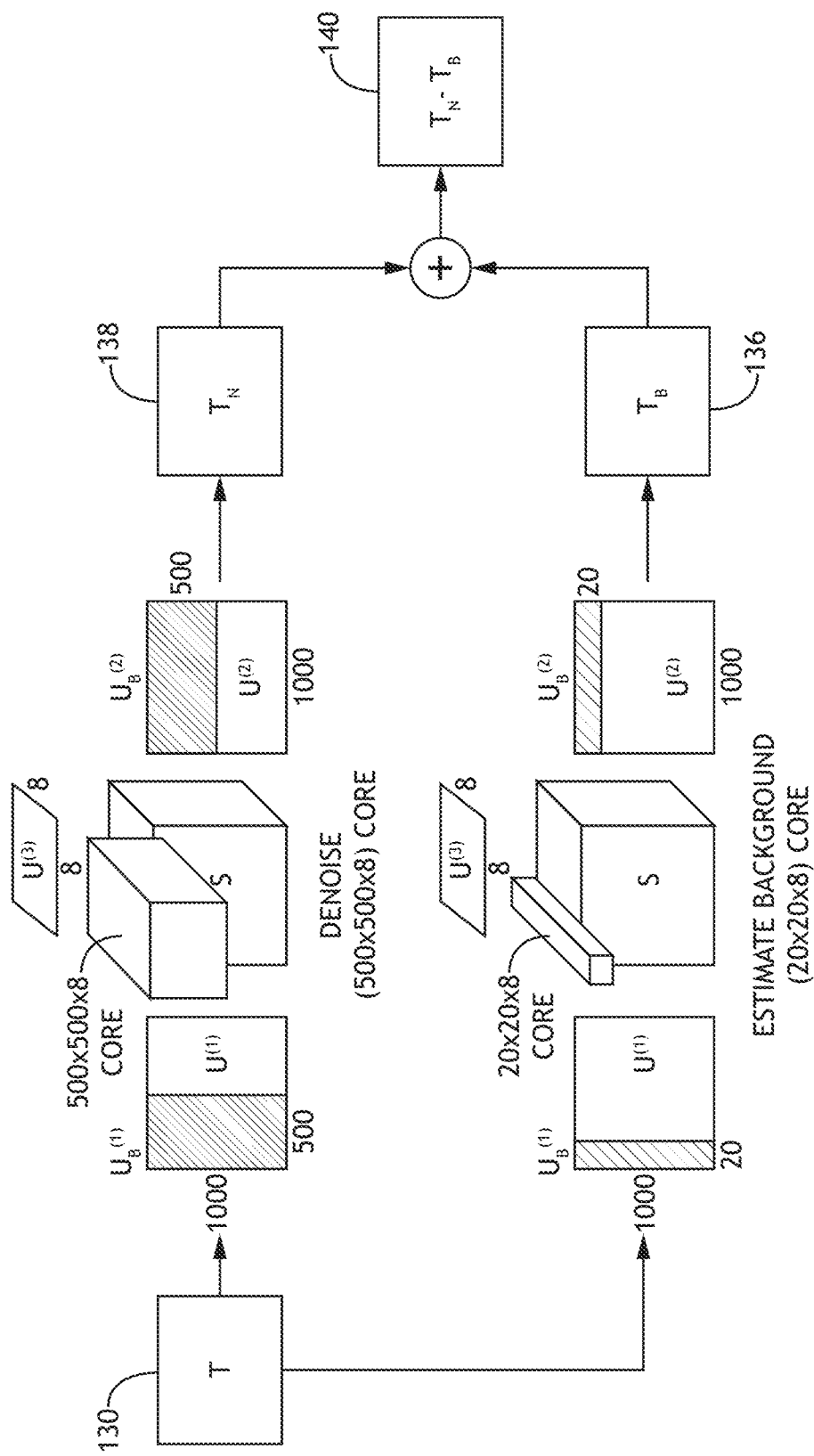
FIG. 8 illustrates a flowchart for performing inspection using tensor decomposition processes and de-noising processes of a target tensor, in accordance with one or more embodiments of the present disclosure.

FIG. 8 illustrates a flowchart for performing inspection using tensor decomposition processes and de-noising processes of a target tensor 130 (T), in accordance with one or more embodiments of the present disclosure.

As shown in the lower path of FIG. 8, the controller 104 may be configured to generate a reference tensor 136 ($T_B$) including reference image frames 145 based on a target tensor 130 (T) generated based on target image frames 125, as discussed previously herein with respect to FIGS. 2-6C. In additional and/or alternative embodiments, the controller 104 may be configured to perform an additional set of decomposition processes on the target tensor 130 (T) in order to form a de-noised target tensor 138.

For example, as shown in the upper path of FIG. 8 and similarly described previously herein, the controller 104 may be configured to perform a set of one or more decomposition processes on the target tensor 130 and further perform one or more high-rank approximations to generate a de-noised target tensor 138 ($T_N$). In embodiments, the de-noised target tensor 138 ($T_N$) may include one or more de-noised target image frames corresponding to the target image frames 125a-125n. The controller 104 may be configured to store the de-noised target tensor 138 ($T_N$) and de-noised target image frames in memory 108. It is noted herein that any discussion associated with the decomposition processes and approximations of FIGS. 2-6C may be regarded as applying to the decomposition processes and approximations of FIG. 8, unless noted otherwise herein.

Continuing with reference to FIG. 8, after forming the de-noised target tensor 138 ($T_N$) and the reference tensor 136 ($T_B$), the controller 104 may be configured to identify one or more characteristics of the sample 120 by comparing the de-noised target tensor 138 ($T_N$) and the reference tensor 136 ($T_B$). For example, the controller 104 may be configured to identify one or more differences between the one or more de-noised target image frames and the one or more reference image frames 145 by subtracting the reference tensor 136 ($T_B$) from the de-noised target tensor 138 ($T_N$) to form a difference tensor 140 ($T_N-T_B$). Subsequently, the controller 104 may determine one or more characteristics of the sample 120 based on difference image frames 155 of the difference tensor 140 ($T_N-T_B$).

It is contemplated herein that the system and method of the present disclosure may reduce noise experienced from using measured reference images constructed from adjacent die in a conventional die-to-die reference die subtraction. Additionally, the system and method of the present disclosure may avoid process variation error introduced by adjacent reference die by tracking process variations within the target image frames 125a-125n via low-rank approximations. The reduction of process variation error has been found to be especially valuable near the edges of a sample 120. Furthermore, due to the fact that the reference image frames 145 are generated directly from the target image frames 125, the system and method of the present disclosure may avoid die-to-die alignment errors between the target die and adjacent reference die. Finally, decomposition processes may be used to ne-noise the target image frames, further improving the determination and identification of characteristics of a sample 120.

As noted previously herein, using conventional inspection techniques, defect detection on a sample 120 may be highly dependent on the quality of the acquired difference images. Due to process variation, test die and reference die could be vastly different, which may result in significant pattern noise within the difference images. If not removed, this pattern noise within the difference images may hinder the ability of conventional inspection systems to detect small defects on the sample 120. Utilizing reference die for multiple die rows (a common practice for mask inspection) may further reduce the effectiveness of defect detection.

Additionally, the effectiveness of conventional inspection techniques utilizing target images and reference images hinges on the assumption that some reference die resemble the target die. However, there is no guarantee that every sample 120 will include reference die which will resemble the target die. Additionally, there could be multiple structures on the target die, with some structures resembling those of a reference die, and others not. This mis-matching of target structures may create pattern artifacts on the difference images, further inhibiting the utility of conventional inspection techniques.

Accordingly, additional and/or alternative embodiments of the present disclosure are directed to the application of decomposition and approximation processes on difference images directly. This may be further understood with reference to FIGS. 9 and 10.

Figure 9:
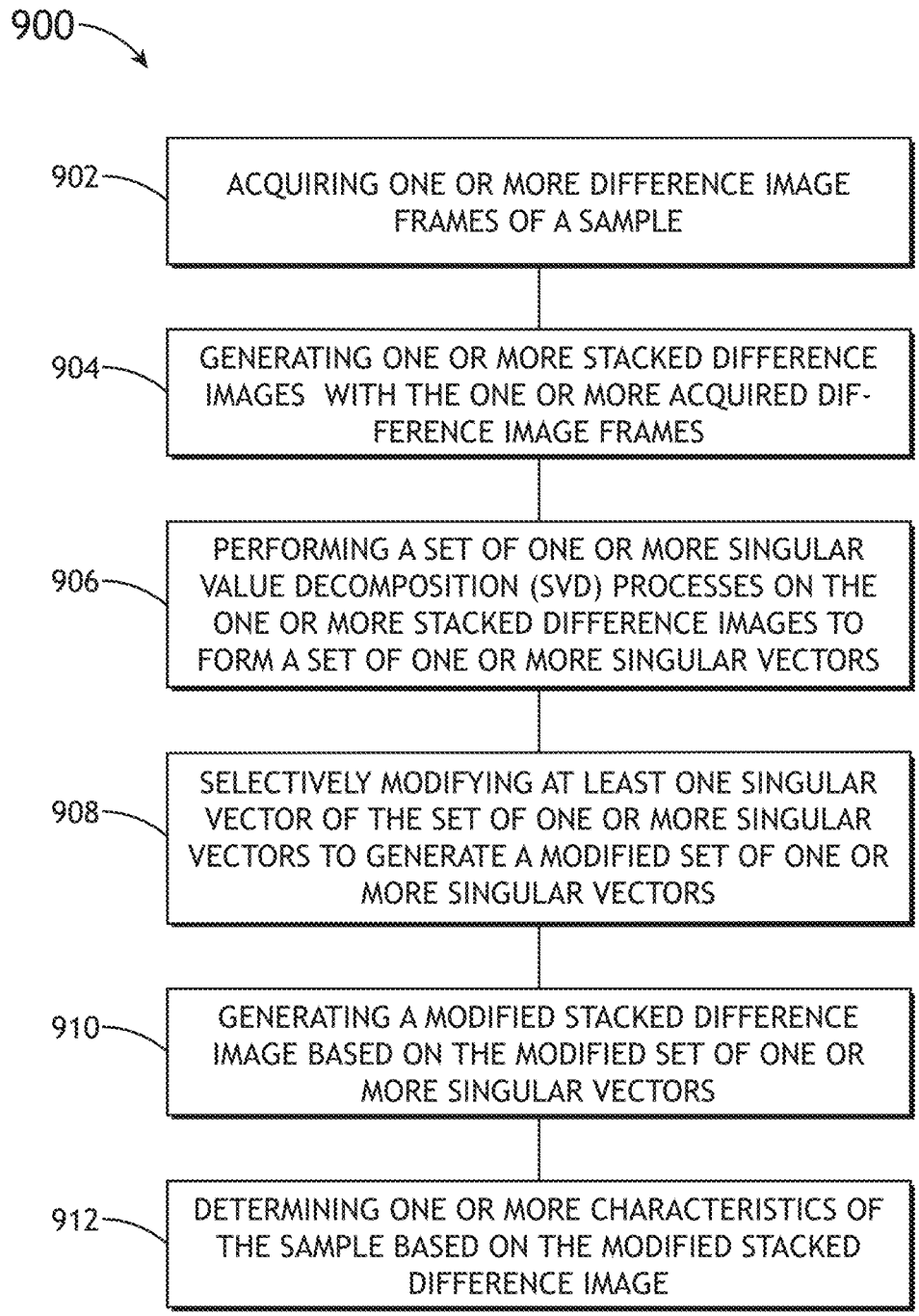
FIG. 9 illustrates a flowchart of a method for performing inspection using singular value decomposition (SVD) processes, in accordance with one or more embodiments of the present disclosure.

FIG. 9 illustrates a flowchart of a method 900 for performing inspection using singular value decomposition (SVD) processes, in accordance with one or more embodiments of the present disclosure. It is noted herein that the steps of method 900 may be implemented all or in part by system 100. It is further recognized, however, that the method 900 is not limited to the system 100 in that additional or alternative system-level embodiments may carry out all or part of the steps of method 900. It is further noted herein that any discussion associated with method 200 illustrated in FIGS. 2-8 may be regarded as applying to method 900, unless noted otherwise herein.

Figure 10:
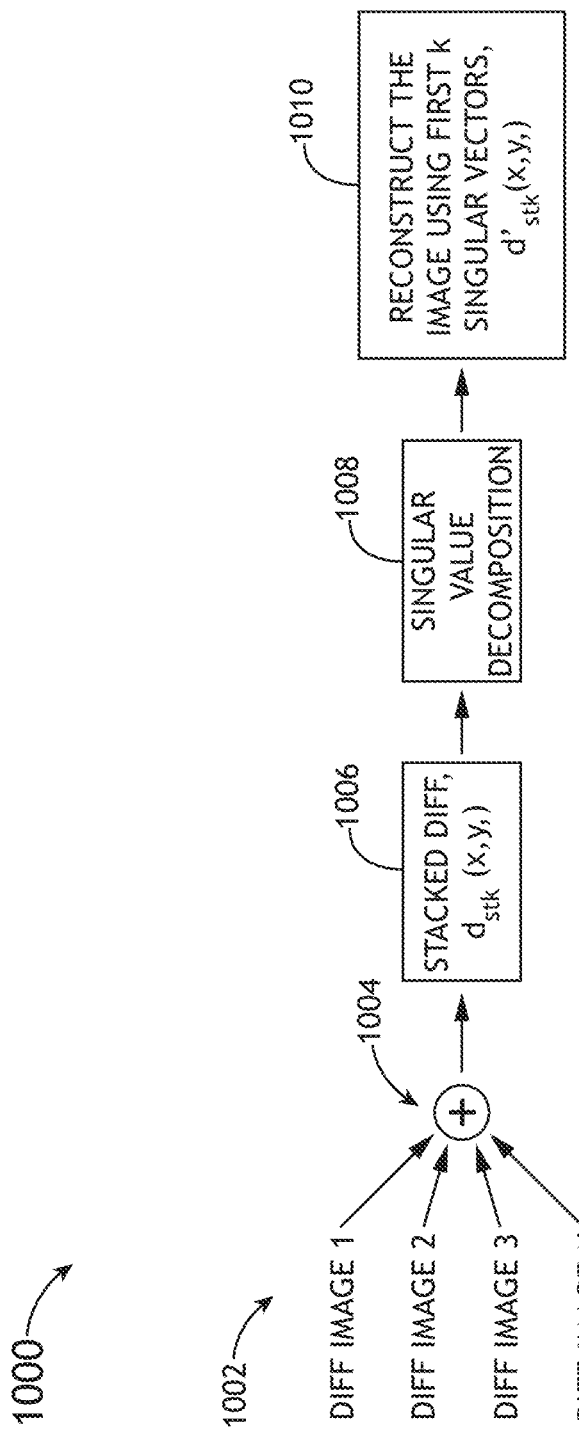
FIG. 10 illustrates a flowchart of a method for performing inspection using singular value decomposition (SVD) processes, in accordance with one or more embodiments of the present disclosure.

In a step 902, one or more difference image frames of a sample 120 are acquired. For example, FIG. 10 illustrates a flowchart of a method for performing inspection using singular value decomposition (SVD) processes, in accordance with one or more embodiments of the present disclosure. As shown in step 1002 of FIG. 10, a controller 104 may be configured to acquire one or more difference image frames of a sample 120. The one or more difference images may be acquired from any source known in the art including, but not limited to, the inspection sub-system 102, memory 108, a network, and the like.

In some embodiments, the one or more difference image frames may include one or more difference image frames which are based on and/or generated from one or more target image frames and one or more reference image frames. For example, as previously shown and described in FIGS. 6A-6C, the one or more difference image frames may be generated by subtracting reference image frames from target image frames. In embodiments, the controller 104 may be configured to store the acquired difference images and difference image frames in memory 108.

In a step 904, one or more stacked difference images are generated. For example, as shown in steps 1004 and 1006 of FIG. 10, the one or more acquired difference image frames may be stacked and/or compiled to generate one or more stacked difference images ($d_{stk}(x,y)$). In embodiments, the stacked difference images ($d_{stk}(x,y)$) may contain residual pattern noise. The controller 104 may store the stacked difference images ($d_{stk}(x,y)$) in memory 108.

In a step 906, a set of one or more singular value decomposition (SVD) processes are performed on the one or more stacked difference images ($d_{stk}(x,y)$) to form a set of one or more singular vectors. For example, as shown in step 1008, the controller 104 may be configured to perform one or more SVD processes on the stacked difference images ($d_{stk}(x,y)$) to form a set of one or more singular vectors. In SVD processes, an image (e.g., stacked difference image ($d_{stk}(x,y)$)) is composed of multiple singular vectors, which correspond to different features of the image. Through SVD, singular vectors corresponding to high-ranked information of the image receive a higher singular value, and vice versa. In embodiments, the controller 104 is configured to store the singular vectors in memory 108.

In a step 908, at least one singular vector of the set of one or more singular vectors are selectively removed and/or modified in order to generate a modified set of one or more singular vectors. It is noted herein that pattern noise may typically appear within the high-ranked vectors of the stacked difference image due to the fact that pattern noise is generally a high-ranged image. A pixel of an ideal difference image may be generated from a gaussian distribution, in which all singular vectors are given similar weights. It should be noted that, in reality, pixels from difference images come from a correlated Gaussian distribution due to the point spread function (PSF). In effect, weights of singular values may fade or degrade over time. Accordingly, in order to remove pattern noise, the controller 104 may be configured to truncate (selectively remove and/or modify) one or more singular vectors of the set of singular vectors of the stacked difference image ($d_{stk}(x,y)$) in order to generate a modified set of one or more singular vectors.

In step 910, a modified stacked difference image is generated based on the modified set of one or more singular vectors. For example, the controller 104 may be configured to reconstruct the decomposed stacked difference image ($d_{stk}(x,y)$) as a high-order stacked difference image ($d'_{stk}(x,y)$) based on the modified set of one or more singular vectors (e.g., set of remaining, non-truncated singular vectors). For instance, the controller 104 may be configured to generate the high-order stacked difference image ($d'_{stk}(x,y)$) using the first k number of singular vectors. In this regard, the controller 104 may be configured to reconstruct the stacked difference image ($d_{stk}(x,y)$) by truncating one or more singular vectors. As noted previously herein, pattern noise may typically appear within the high-ranked vectors of the stacked difference image. Accordingly, by subtracting the effects of high-ranked vectors (e.g., subtracting high-order stacked difference image ($d'_{stk}(x,y)$)) from the original stacked difference image ($d_{stk}(x,y)$), the effects of high-order singular vectors may be removed, thereby removing effects of pattern noise.

In embodiments, the controller 104 may be configured to perform one or more truncated SVD processes (tSVD) in order to split the stacked difference images ($d_{stk}(x,y)$) into multiple rectangular segments. It is contemplated herein that truncating singular vectors and splitting image frames via SVD and/or tSVD processes may enable significant throughput improvements. In particular, it has been found that a relationship between an optimal truncation number and image variance may be expressedd according to Equation 3:

$$k_{opt} = \frac{\sigma^2}{K} \quad (3)$$

wherein $k_{opt}$ defines an optimal truncation number, $\sigma^2$ defines the variance of a stacked difference image, and K defines an empirically determined constant. In this regard, the number of singular vectors to be truncated (e.g., $k_{opt}$) may be determined according to Equation 3.

In a step 912, one or more characteristics of the sample 120 are determined based on the modified stacked difference image ($d_{clean}(x,y)$). For example, the controller 104 may be configured to determine one or more characteristics of the sample 120 based on one or more characteristics of the one or more modified stacked difference images ($d_{clean}(x,y)$). The controller 104 may be configured to determine any characteristics of the sample 120 known in the art including, but not limited to, defects (e.g., defect location, defect type), measurements (e.g., critical dimensions), and the like.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., body of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

Although particular embodiments of this invention have been illustrated, it is apparent that various modifications and embodiments of the invention may be made by those skilled in the art without departing from the scope and spirit of the foregoing disclosure. It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Accordingly, the scope of the invention should be limited only by the claims appended hereto.

What is claimed:

1. A sample characterization system, comprising:
    a controller communicatively coupled to an inspection sub-system, the controller including one or more processors configured to execute a set of program instructions stored in memory, the set of program instructions configured to cause the one or more processors to:
    acquire one or more target image frames of a sample;
    generate a target tensor with the one or more acquired target image frames;
    perform a first set of one or more decomposition processes on the target tensor to generate one or more reference tensors including one or more reference image frames;
    identify one or more differences between the one or more target image frames and the one or more reference image frames; and
    determine one or more characteristics of the sample based on the one or more identified differences.

2. The system of claim 1, wherein the first set of one or more decomposition processes comprises Tucker decomposition process.

3. The system of claim 2, wherein the Tucker decomposition process comprises a multilinear singular value decomposition process.

4. The system of claim 1, wherein the controller is configured to perform the first set of one or more decomposition processes on the target tensor using a first orthonormal basis vector for a column space of the target tensor, a second orthonormal basis vector for a row space of the target tensor, and a third orthonormal basis vector for a stack space of the target tensor.

5. The system of claim 1, wherein the controller is configured to generate the one or more reference tensors by:
    performing one or more low-rank approximations of a core tensor used to carry out the one or more decomposition processes.

6. The system of claim 5, wherein the controller is configured to perform the one or more low-rank approximations by truncating at least a portion of the core tensor.

7. The system of claim 5, wherein the controller is configured to perform the one or more low-rank approximations by truncating one or more orthonormal basis vectors used for the one or more decomposition processes.

8. The system of claim 1, wherein the one or more identified characteristics comprise a defect of the sample.

9. The system of claim 1, wherein the controller is further configured to:
    generate one or more control signals configured to selectively adjust one or more characteristics of one or more process tools based on the one or more determined characteristics.

10. The system of claim 1, wherein the controller is further configured to:
    perform a second set of one or more decomposition processes on the target tensor to form a de-noised core tensor; and
    perform one or more high-rank approximations on the de-noised core tensor to generate a de-noised target tensor, the de-noised target tensor including one or more de-noised target image frames.

11. The system of claim 10, wherein the controller is further configured to:
    identify one or more differences between the one or more de-noised target image frames and the one or more reference image frames; and
    determine one or more characteristics of the sample based on the one or more identified differences.

12. A method for characterizing a sample, comprising:
    acquiring one or more target image frames of a sample;
    generating a target tensor with the one or more acquired target image frames;
    performing a first set of one or more decomposition processes on the target tensor to generate one or more reference tensors including one or more reference image frames;
    identifying one or more differences between the one or more target image frames and the one or more reference image frames; and
    determining one or more characteristics of the sample based on the one or more identified differences.

13. The method of claim 12, wherein the first set of one or more decomposition processes comprise a Tucker decomposition process.

14. The method of claim 13, wherein the Tucker decomposition process comprises a multilinear singular value decomposition process.

15. The method of claim 12, wherein performing the first set of one or more decomposition processes on the target tensor comprises:
    performing the first set of one or more decomposition processes on the target tensor using a first orthonormal basis vector for a row space of the target tensor, a second orthonormal basis vector for a column space of the target tensor, and a third orthonormal basis vector for a stack space of the target tensor.

16. The method of claim 12, wherein generating one or more reference tensors including one or more reference image frames based on a core tensor comprises:
performing one or more low-rank approximations of the core tensor used to carry out the one or more decomposition processes.

17. The method of claim 16, wherein the performing one or more low-rank approximations of the core tensor comprises:
truncating at least a portion of the core tensor.

18. The method of claim 16, wherein the performing one or more low-rank approximations of the core tensor comprises:
truncating one or more orthonormal basis vectors used for the one or more decomposition processes.

19. The method of claim 12, wherein the one or more identified characteristics comprise a defect of the sample.

20. The method of claim 12, further comprising:
generating one or more control signals configured to selectively adjust one or more characteristics of one or more process tools based on the one or more determined characteristics.

21. The method of claim 12, further comprising:
performing a second set of one or more decomposition processes on the target tensor to form a de-noised core tensor; and
performing one or more high-rank approximations on the de-noised core tensor to generate a de-noised target tensor, the de-noised target tensor including one or more de-noised target image frames.

22. The method of claim 21, further comprising:
identifying one or more differences between the one or more de-noised target image frames and the one or more reference image frames; and
determining one or more characteristics of the sample based on the one or more identified differences.

23. A sample characterization system, comprising:
a controller communicatively coupled to an inspection sub-system, the controller including one or more processors configured to execute a set of program instructions stored in memory, the set of program instructions configured to cause the one or more processors to:
acquire one or more difference image frames of a sample, the one or more difference image frames based on one or more target image frames and one or more reference image frames;
generate one or more stacked difference images with the one or more acquired difference image frames;
perform a set of one or more singular value decomposition (SVD) processes on the one or more stacked difference images to form a set of one or more singular vectors;
selectively modify at least one singular vector of the set of one or more singular vectors to generate a modified set of one or more singular vectors;
generate a modified stacked difference image based on the modified set of one or more singular vectors; and
determine one or more characteristics of the sample based on the modified stacked difference image.

24. The system of claim 23, wherein the controller is configured to determine one or more characteristics of the sample based on a gray level of one or more pixels of the modified stacked difference image.

25. The system of claim 23, wherein the controller is configured to selectively modify the at least one singular vector of the set of one or more singular vectors by:
truncating a first k number of singular vectors of a first set of one or more singular vectors.

26. The system of claim 25, wherein k is determined according to the equation $k\sigma^2/K = \sigma 2K\sigma^2/K$, wherein $\sigma^2$ comprises a variance value of the one or more stacked difference images and K comprises an empirically determined constant.

27. The system of claim 23, wherein the one or more identified characteristics comprise a defect of the sample.

28. The system of claim 23, wherein the controller is further configured to:
generate one or more control signals configured to selectively adjust one or more characteristics of one or more process tools based on the one or more determined characteristics.

29. A method for characterizing a sample, comprising:
acquiring one or more difference image frames of a sample, the one or more difference image frames based on one or more target image frames and one or more reference image frames;
generating one or more stacked difference images with the one or more acquired difference image frames;
performing a set of one or more singular value decomposition (SVD) processes on the one or more stacked difference images to form a set of one or more singular vectors;
selectively modifying at least one singular vector of the set of one or more singular vectors to generate a modified set of one or more singular vectors;
generating a modified stacked difference image based on the modified set of one or more singular vectors; and
determining one or more characteristics of the sample based on the modified stacked difference image.

* * * * *